United States Patent
Yang et al.

(10) Patent No.: US 10,258,965 B2
(45) Date of Patent: Apr. 16, 2019

(54) SULFUR-RESISTANT CATALYST FOR AROMATICS SATURATED HYDROGENATION AND PREPARATION METHOD THEREOF

(71) Applicant: PetroChina Company Limited, Beijing (CN)

(72) Inventors: Xiaodong Yang, Daqing (CN); Yanfeng Liu, Daqing (CN); Sheng Hu, Daqing (CN); Chunmei Yu, Daqing (CN); Hongling Chu, Daqing (CN); Xinmiao Wang, Daqing (CN); Shanbin Gao, Daqing (CN); Bin Xie, Daqing (CN); Famin Sun, Daqing (CN); Wencheng Zhang, Daqing (CN); Jintao Guo, Daqing (CN); Quanguo Zhang, Daqing (CN); Lili Jiang, Daqing (CN); Xiaofeng Wang, Daqing (CN); Yuanyuan Ji, Daqing (CN); Ran Sun, Daqing (CN); Yuxiao Feng, Daqing (CN); Xianjun Wu, Daqing (CN); Guojia Zhang, Daqing (CN); Tan Zhao, Daqing (CN); Wenyong Liu, Daqing (CN); Rui Li, Daqing (CN); Ruifeng Li, Daqing (CN); Cheng Tang, Daqing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 554 days.

(21) Appl. No.: 14/964,204

(22) Filed: Dec. 9, 2015

(65) Prior Publication Data
US 2016/0167017 A1   Jun. 16, 2016

(30) Foreign Application Priority Data
Dec. 10, 2014 (CN) .......................... 2014 1 0758718

(51) Int. Cl.
   *B01J 23/40*    (2006.01)
   *B01J 23/44*    (2006.01)
   (Continued)

(52) U.S. Cl.
   CPC .............. *B01J 23/40* (2013.01); *B01J 23/44* (2013.01); *B01J 35/0073* (2013.01);
   (Continued)

(58) Field of Classification Search
   CPC .............. B01J 2523/00; B01J 2523/31; B01J 2523/41; B01J 2523/48; B01J 2523/824;
   (Continued)

(56) References Cited

U.S. PATENT DOCUMENTS 2,898,289 A * 8/1959 Kimberlin, Jr. .......... B01J 23/40
                                                        208/138
3,869,522 A    3/1975 Van der Eijk
                       (Continued)

FOREIGN PATENT DOCUMENTS

CN    1362490 A    8/2002
CN    1370814 A    9/2002
      (Continued)

OTHER PUBLICATIONS

Nan et al.; "Deactivation of Pd/Al₂O₃ catalyst for selective hydrogenation of full-range reformate gasoline;" Industrial Catalysis, vol. 15, No. 1, Jan. 31, 2007, pp. 8-13. (Abstract provided).
(Continued)

*Primary Examiner* — Renee Robinson
*Assistant Examiner* — Derek N Mueller
(74) *Attorney, Agent, or Firm* — Hamilton, Brook, Smith & Reynolds, P.C.

(57) ABSTRACT

The present invention relates to a method for preparing a sulfur-resistant catalyst for aromatics saturated hydrogenation, comprising the steps of: preparing noble metal impreg-
(Continued)

Run Time of Oil / hour nation solutions from a noble metal and deionized water or an acid solution; impregnating a carrier with the impregnation solutions sequentially from high to low concentrations by incipient impregnation; homogenizing, drying, and calcinating to obtain the sulfur-resistant catalyst for aromatics saturated hydrogenation. The catalyst for aromatics saturated hydrogenation prepared by the method according to the present invention is primarily used in processing low-sulfur and high-aromatics light distillate, middle distillate, atmospheric gas oil, and vacuum gas oil. The method according to the present invention is advantageous in that the catalyst for aromatics saturated hydrogenation exhibits good hydrofining performance, superior aromatics saturation performance, high liquid yield of products, as well as excellent desulfurization and sulfur-resistance, and the catalyst has remarkable effects in use and a great prospect of application.

12 Claims, 2 Drawing Sheets

(51) Int. Cl.
| | | |
|---|---|---|
| B01J 37/02 | (2006.01) | |
| B01J 37/08 | (2006.01) | |
| C10G 45/52 | (2006.01) | |
| B01J 35/00 | (2006.01) | |
| B01J 35/10 | (2006.01) | |
| B01J 37/28 | (2006.01) | |
| B01J 37/00 | (2006.01) | |

(52) U.S. Cl.
CPC ....... *B01J 37/0203* (2013.01); *B01J 37/0205* (2013.01); *B01J 37/0213* (2013.01); *B01J 37/08* (2013.01); *C10G 45/52* (2013.01); *B01J 35/1019* (2013.01); *B01J 35/1038* (2013.01); *B01J 35/1042* (2013.01); *B01J 37/0009* (2013.01); *B01J 37/28* (2013.01); *B01J 2523/00* (2013.01)

(58) Field of Classification Search
CPC .. B01J 2523/828; B01J 2523/47; B01J 23/40; B01J 23/44; B01J 35/0073; B01J 35/1019; B01J 35/1038; B01J 35/1042; B01J 37/0009; B01J 37/0203; B01J 37/0205; B01J 37/0213; B01J 37/08; B01J 37/28
See application file for complete search history.

(56) References Cited

U.S. PATENT DOCUMENTS

| | | |
|---|---|---|
| 3,943,053 A | 3/1976 | Kovach et al. |
| 4,399,058 A | 8/1983 | Stanulonis et al. |
| 4,849,093 A | 7/1989 | Vauk et al. |
| 5,308,814 A | 5/1994 | Kukes et al. |
| 5,993,644 A | 11/1999 | Xiao et al. |
| 7,737,074 B2 | 6/2010 | Smegal et al. |
| 2004/0082461 A1 | 4/2004 | Remans et al. |
| 2005/0085646 A1 | 4/2005 | Muller et al. |
| 2016/0167029 A1 | 6/2016 | Yang et al. |

FOREIGN PATENT DOCUMENTS

| | | |
|---|---|---|
| CN | 101927169 A1 | 12/2010 |
| CN | 101927176 A | 12/2010 |
| CN | 101927176 A | 12/2010 |
| CN | 101927196 A | 12/2010 |
| CN | 102641739 A | 8/2012 |
| EP | 0 204 314 A2 | 12/1986 |
| EP | 0 204 314 B1 | 11/1990 |
| RU | 2 250 133 C2 | 4/2005 |
| RU | 2 343 976 C2 | 1/2009 |

OTHER PUBLICATIONS

Nan et al.; "Study on Nonuniform Distribution of Active Components in Supported Pd—Pt Bimetallic Catalysts I: Effect of different preparation parameters on the non-uniform distribution of active ingredients;" Chemical Engineering of Oil & Gas, vol. 37, No. 5, Dec. 31, 2008, pp. 271-275. (Abstract provided—Machine translation).

* cited by examiner

SULFUR-RESISTANT CATALYST FOR AROMATICS SATURATED HYDROGENATION AND PREPARATION METHOD THEREOF

RELATED APPLICATION

This application claims priority under 35 U.S.C. § 119 or 365 to China, Application No. 201410758718.7, filed Dec. 10, 2014. The entire teachings of the above application are incorporated herein by reference.

FIELD OF TECHNOLOGY

The present invention relates to a method for preparing a sulfur-resistant catalyst for aromatics saturated hydrogenation, particularly to a method for preparing a catalyst for aromatics saturated hydrogenation for processing low-sulfur and high-aromatics light distillate, middle distillate, atmospheric gas oil, and vacuum gas oil.

BACKGROUND OF THE INVENTION

Worldwide, as the crude oil for processing is becoming heavier and poorer in quality, it has become a common view that, for the processed distillate oils, removal of aromatic compounds in diesel fuels may help to improve the cetane value of diesel, removal of aromatic compounds in aviation kerosene raw materials may contribute to increase the smoke point of products, and removal of aromatics in lubricant base oil raw materials may improve the antioxidant stability of products.

As compared with non-noble metal (cobalt, molybdenum, nickel, and tungsten) sulfide catalysts, noble metals prominently demonstrate more superior hydrogenation performance, and therefore noble metal catalysts are widely used in dearomatization of distillate raw materials. Noble metal catalysts exhibit good dearomatization performance at low temperature. However, the hydrogenation performance of distillate processing by using noble metal catalysts is usually related with their sensitivity to sulfur-containing compounds, while noble metals normally have poor sulfur resistance and therefore noble metal catalyst poisoning tends to occur during the distillate processing. Moreover, distillates from some refineries have high content of sulfur-containing compounds, and it is unqualified to directly use noble metal catalysts for dearomatization without desulfurization treatment of the distillates in advance.

U.S. Pat. No. 3,943,053 discloses a selective aromatics hydrogenation catalyst, and states that the catalyst prepared by the method thereof can maintain its hydrogenation performance for a very long time when used for processing sulfur-containing raw materials, wherein the catalyst employs γ-Al$_2$O$_3$ having high specific surface area as a carrier loaded with platinum and palladium. A crucial issue in the preparation of such a catalyst is to impregnate the carrier with platinum and palladium simultaneously in the same aqueous solution, but the distribution state of the noble metals in the catalyst is not described.

U.S. Pat. No. 5,308,814 discloses a number of carrier materials in a noble metal dearomatization catalyst composition, and describes that a carrier is prepared from Y zeolite and heat resistant inorganic oxides (for example, silica, alumina, or silica and alumina) and loaded with platinum and palladium, wherein the weight ratio of Y zeolite in the carrier is 10 to 90%. Thus, it can be deduced that such a material has strong crackability and is not suitable in the field of hydrofining.

U.S. Pat. No. 4,849,093 discloses a two-step dearomatization saturation method using a hydrogenation catalyst comprising group VIII metals or group VIB metals or combination thereof in a non-noble metal catalyst, but the distribution state of active components in the catalyst is not described in this patent either.

U.S. Pat. No. 3,869,522 discloses an aromatics hydrogenation method in which a carrier containing 30 to 90 wt % silica, 10 to 70 wt % zirconia, and 0 to 25 wt % alumina is prepared. In this patent, platinum is preferably used as the active metal, or its combination with other noble metals may be used as the active metal. Raw materials with a sulfur content exceeding standard may be catalytically desulfurized. It is acknowledged in this patent that the exposure of noble metal hydrogenation catalysts to sulfur-containing compounds leads to sulfur sensitivity to such sulfur-containing compounds, but it is not yet recognized that the noble metal hydrogenation catalysts can be protected by altering the distribution state of noble metals in the catalyst.

Currently, it is conventional in the industry to prepare an impregnation solution having a fixed concentration of active metals and impregnate a catalyst carrier by saturated or oversaturated impregnation followed by drying and calcination to prepare a catalyst. U.S. Pat. No. 4,399,058 introduces a method for preparing a hydrogenation catalyst in which group VIB and group VIII metal salts are mixed with aqueous ammonia followed by further addition of aqueous ammonia to adjust pH to a certain value so as to prepare a noble metal solution at a fixed concentration, and an inorganic oxide carrier is saturated impregnated with the metal solution, dried and calcinated to provide a hydrogenation catalyst.

European patent EP 0 204 314 describes a method for preparing a hydrogenation catalyst with an uneven distribution of noble metal components. In the preparation process, a stepwise multiple-impregnation approach is employed to load the noble metal components, i.e., a carrier is impregnated with a solution of active component A, and then washed, dried, and calcinated; subsequently, it is impregnated with an impregnation solution of active component B, and washed, dried, and calcinated again. By using a preparation method including stepwise washing, drying and calcinating, the noble metal content within the catalyst particle is made higher than the metal content on its surface, and the life span of such catalyst with an uneven distribution is extended as compared to a catalyst with an even distribution. However, due to the complexity of this preparation method and loss of noble metals in the preparation process, the cost for preparation of such a catalyst is rather high.

SUMMARY OF THE INVENTION

An objective of the present invention is to provide a method for preparing a sulfur-resistant catalyst for aromatics saturated hydrogenation in order to expand the applicability of raw materials for aromatics saturated hydrogenation, improve the sulfur resistance of the catalyst, and lengthen the life span of the catalyst. By controlling the gradient distribution of the noble metal component within the catalyst particle, the present invention improves the sulfur resistance of the noble metal.

To achieve the above objective, the present invention provides a method for preparing a sulfur-resistant catalyst for aromatics saturated hydrogenation, comprising the steps of:

(1) preparing noble metal impregnation solutions from a noble metal and deionized water or an acid solution;
(2) impregnating a carrier consisting of an inorganic porous material with the impregnation solutions by incipient impregnation; and
(3) homogenizing for 10 min to 3 h, drying at 90 to 140° C. for 3 to 6 h, and calcinating at 350 to 650° C. for 3 to 10 h to obtain a sulfur-resistant catalyst for aromatics saturated hydrogenation;

wherein, during the impregnation in the above step (2), the carrier is impregnated sequentially with the impregnation solutions from high to low concentrations, or a noble metal impregnation solution at a high concentration is prepared and then the concentration of the active metal-containing impregnation solution is gradually lowered.

In the method for preparing a sulfur-resistant catalyst for aromatics saturated hydrogenation according to the present invention, the inorganic porous material is preferably comprised of alumina and at least one selected from the group consisting of silica, titania-zirconia, alumina-silica, alumina-zirconia.

In the method for preparing a sulfur-resistant catalyst for aromatics saturated hydrogenation according to the present invention, the carrier preferably has a specific surface area of 150 to 500 m$^2$/g and a pore volume of 0.2 to 0.7 cm$^3$/g.

In the method for preparing a sulfur-resistant catalyst for aromatics saturated hydrogenation according to the present invention, the carrier preferably has a specific surface area of 200 to 400 m$^2$/g and a pore volume of 0.3 to 0.6 cm$^3$/g.

In the method for preparing a sulfur-resistant catalyst for aromatics saturated hydrogenation according to the present invention, the mass ratio of aluminum to silicon (in terms of alumina to silica) is 1:10 to 10:1 when the inorganic porous material is comprised of alumina and at least one selected from the group consisting of silica and alumina-silica; the mass ratio of aluminum to zirconium (in terms of alumina to zirconia) is 1:20 to 20:1 when the inorganic porous material is comprised of alumina and at least one selected from the group consisting of titania-zirconia and alumina-zirconia.

In the method for preparing a sulfur-resistant catalyst for aromatics saturated hydrogenation according to the present invention, the noble metal is preferably selected from at least one from the group consisting of Pt, Pd, Ru, Rh, Re, and Ir compounds, and the mass fraction of the noble metal contained in the catalyst is preferably 0.05 to 5.0 wt %.

In the method for preparing a sulfur-resistant catalyst for aromatics saturated hydrogenation according to the present invention, the noble metal is preferably one or two of Pt, Pd, Ru, and Re compounds, and the mass fraction of the noble metal contained in the catalyst is preferably 0.2 to 2.0 wt %.

In the method for preparing a sulfur-resistant catalyst for aromatics saturated hydrogenation according to the present invention, the noble metal is preferably Pt and Pd, and the mass ratio of Pt to Pd comprised in the catalyst is preferably 1:6 to 6:1.

In the method for preparing a sulfur-resistant catalyst for aromatics saturated hydrogenation according to the present invention, the acid component in the acid solution is preferably selected from at least one from the group consisting of hydrochloric acid, phosphoric acid, biphosphate, dihydric phosphate, sulfuric acid, bisulfate, acetic acid, citric acid, and nitric acid.

In the method for preparing a sulfur-resistant catalyst for aromatics saturated hydrogenation according to the present invention, the concentration of the noble metal component in the catalyst decreases gradually from the center of the particle to the outer surface thereof, the ratio of the metal content at the circumcenter of the particle to the metal content on the circumcircle surface of the particle is preferably 2.0 to 6.0, and the ratio of the metal content at 0.5 R to the metal content on the outer surface is preferably 3.0 to 1.5, where the circumradius is R with the circumcenter of the cross section of the catalyst particle taken as the starting point.

In the process of preparing the carrier for the catalyst, the inorganic porous material is kneaded and compression molded or extrusion molded into a catalyst in a form of a circular shape, a cylindrical shape, a three-leaf clover shape or a four-leaf clover shape, followed by drying and calcination at high temperature to afford the carrier.

The catalyst for aromatics saturated hydrogenation according to the present invention is advantageous in that the concentration of the noble metal active component within the catalyst particle decreases in a gradient distribution from the center to the outside, and the catalyst exhibits superior aromatics saturation activity and stability, excellent sulfur-resistance in processing low-sulfur raw materials, as well as good refining performance and high liquid yield of products. The catalyst for aromatics saturated hydrogenation prepared according to the present invention shows remarkable effects in processing low-sulfur and high-aromatics light distillate, middle distillate, atmospheric gas oil, and vacuum gas oil and has a great prospect of application.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF PREFERRED EMBODIMENTS

Figure 1:
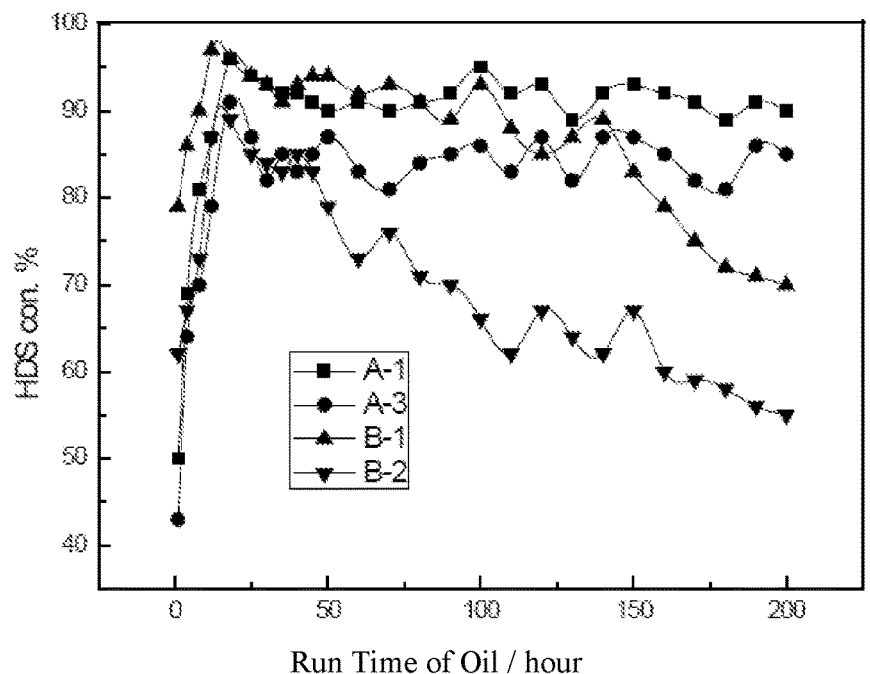
FIG. 1 is a schematic plot of the sulfur resistance and hydrodesulfurization performance of the catalysts prepared in Example 1, Example 3, Comparative Example 1 and Comparative Example 2.

The present invention is now further described in details by referring to specific examples, but the present invention is not limited to the following Examples. Any modification without departing from the spirit and scope of the present invention falls within the scope of the present invention.

Example 1

An inorganic porous material containing 96 wt % of $Al_2O_3$ and $Al_2O_3$—$SiO_2$ and 4 wt % $ZrO_2$ in the carrier was mechanically kneaded into a carrier (the mass ratio of $Al_2O_3$ to $SiO_2$ in the carrier was 10:1, and the mass ratio of $Al_2O_3$ to $ZrO_2$ was 20:1), and then extruded, dried and calcinated to prepare the carrier final product.

Incipient impregnation was employed to prepare the catalyst carrier with a water absorption of 0.89 ml/g. 200 g of the carrier was weighed and sprayed and impregnated with 78 ml of an impregnation solution containing 1.0 wt % $PtCl_2$ and 0.3 wt % $PdCl_2$. During the spray impregnation, 100 ml of an impregnation solution containing 0.2 wt % $PtCl_2$, 0.1 wt % $PdCl_2$, and an acid at a concentration of 0.2 mol/L ($H_3PO_4$+HCl) was dropped into the previous impregnation solution at a constant speed over 30 minutes. The catalyst was homogenized in the spray impregnation apparatus for 40 minutes, dried at 90° C. for 4 hours, and then calcinated at 550° C. for 6 hours to afford catalyst A-1.

Example 2

An inorganic porous material containing 30 wt % of $Al_2O_3$ and $SiO_2$, 45 wt % $ZrO_2$, and 25 wt % $ZrO_2$—$TiO_2$ in the carrier was mechanically kneaded into a carrier (the mass ratio of $Al_2O_3$ to $SiO_2$ in the carrier was 1:10, and the mass ratio of $Al_2O_3$ to $ZrO_2$ was 1:20), and then extruded, dried and calcinated to prepare the carrier final product.

Incipient impregnation was employed to prepare the catalyst carrier with a water absorption of 0.89 ml/g. 200 g of the carrier was weighed and sprayed and impregnated with 78 ml of an impregnation solution containing 1.0 w % $PtCl_2$ and 0.3 wt % $PdCl_2$. During the spray impregnation, 100 ml of an impregnation solution containing 0.2 wt % $PtCl_2$, 0.1 wt % $PdCl_2$, and an acid at a concentration of 0.2 mol/L (nitric acid+citric acid) was dropped into the previous impregnation solution at a constant speed over 30 minutes. The catalyst was homogenized in the spray impregnation apparatus for 10 minutes, dried at 140° C. for 3 hours, and then calcinated at 500° C. for 8 hours to afford catalyst A-2.

Example 3

An inorganic porous material containing 60 wt % of $Al_2O_3$ and $Al_2O_3$—$SiO_2$, 20 wt % $ZrO_2$, and 20 wt % $ZrO_2$—$TiO_2$ in the carrier was mechanically kneaded into a carrier (the mass ratio of $Al_2O_3$ to $SiO_2$ in the carrier was 5:1, and the mass ratio of $Al_2O_3$ to $ZrO_2$ was 5:1), and then extruded, dried and calcinated to prepare the carrier final product.

Incipient impregnation was employed to prepare the catalyst carrier with a water absorption of 0.89 ml/g. 200 g of the carrier was weighed and sprayed and impregnated with 78 ml of an impregnation solution containing 1.0 wt % $PtCl_2$ and 0.3 wt % $PdCl_2$. During the spray impregnation, 100 ml of an impregnation solution containing 0.2 wt % $PtCl_2$, 0.1 wt % $PdCl_2$, and an acid at a concentration of 0.2 mol/L ($H_3PO_4$+HCl) was dropped into the previous impregnation solution at a constant speed over 30 minutes. The catalyst was homogenized in the spray impregnation apparatus for 3 hours, dried at 100° C. for 6 hours, and then calcinated at 650° C. for 3 hours to afford catalyst A-3.

Example 4

An inorganic porous material containing 45 wt % of $Al_2O_3$—$ZrO_2$, 45 wt % $Al_2O_3$—$SiO_2$, and 10 wt % $TiO_2$ in the carrier was mechanically kneaded into a carrier (the mass ratio of $Al_2O_3$ to $SiO_2$ in the carrier was 1:1, and the mass ratio of $Al_2O_3$ to $ZrO_2$ was 1:1), and then extruded, dried and calcinated to prepare the carrier final product.

Incipient impregnation was employed to prepare the catalyst carrier with a water absorption of 0.89 ml/g. 200 g of the carrier was weighed and sprayed and impregnated with 78 ml of an impregnation solution containing 1.0 wt % $PtCl_2$ and 0.3 wt % $PdCl_2$. During the spray impregnation, 100 ml of an impregnation solution containing 0.2 wt % $PtCl_2$, 0.1 wt % $PdCl_2$, and an acid at a concentration of 0.3 mol/L (biphosphate+dihydric phosphate+acetic acid) was dropped into the previous impregnation solution at a constant speed over 30 minutes. The catalyst was homogenized in the spray impregnation apparatus for 50 minutes, dried at 90° C. for 5 hours, and then calcinated at 350° C. for 10 hours to afford catalyst A-4.

Example 5

An inorganic porous material containing 50 wt % of $Al_2O_3$—$SiO_2$, 20 wt % $Al_2O_3$—$ZrO_2$, 10 wt % $Al_2O_3$, and 20 wt % $Al_2O_3$—$TiO_2$ in the carrier was mechanically kneaded into a carrier (the mass ratio of $Al_2O_3$ to $SiO_2$ in the carrier was 3:1, and the mass ratio of $Al_2O_3$ to $ZrO_2$ was 10:1), and then extruded, dried and calcinated to prepare the carrier final product.

Incipient impregnation was employed to prepare the catalyst carrier with a water absorption of 0.89 ml/g. The remaining homogenization, drying and calcination steps were the same as in Example 1, except that a phosphoric acid+sulfuric acid+bisulfate mixed solution at a concentration of 0.25 mol/L was used as the acid solution in the impregnation step, to afford catalyst A-5.

Example 6

With the exception that 100 ml of an impregnation solution containing 1.0 wt % $PtCl_2$ and 0.3 wt % $PdCl_2$ was sprayed and impregnated while 78 ml of an impregnation solution containing 0.2 wt % $PtCl_2$, 0.1 wt % $PdCl_2$, and an acid at a concentration of 0.2 mol/L ($H_3PO_4$+HCl) was dropped into the previous impregnation solution at a constant speed, the same remaining steps as in Example 1 were conducted to afford catalyst A-6.

Comparative Example 1

With the exception that a carrier was prepared from $Al_2O_3$ raw material, and 200 g of the carrier was weighed and sprayed and impregnated with 178 ml of an impregnation solution containing 0.55 wt % $PtCl_2$, 0.19 wt % $PdCl_2$, and an acid at a concentration of 0.11 wt % ($H_3PO_4$+HCl), the same remaining steps as in Example 1 were conducted to afford catalyst B-1.

Comparative Example 2

Catalyst B-2 was prepared in the same catalyst preparation process as in Comparative Example 1, with the exception that a carrier was prepared from $SiO_2$ as raw material.

Example 7

Catalysts A-1, A-2, A-3, A-4, A-5, A-6, B-1, and B-2 were characterized by using EDS characterization means.

TABLE 1

Results of physical properties of the catalysts

| No. | A-1 | A-2 | A-3 | A-4 | A-5 | A-6 | B-1 | B-2 |
|---|---|---|---|---|---|---|---|---|
| Pt + Pd(center)/Pt + Pd(outer surface) | 3.5 | | | | | | | |
| Pt + Pd(0.5R)/Pt + Pd(outer surface) | 1.8 | | | | | | | |
| Pt + Pd(center)/Pt + Pd(outer surface) | | 3.7 | | | | | | |
| Pt + Pd(0.5R)/Pt + Pd(outer surface) | | 2.0 | | | | | | |
| Pt + Pd(center)/Pt + Pd(outer surface) | | | 2.9 | | | | | |
| Pt + Pd(0.5R)/Pt + Pd(outer surface) | | | 1.6 | | | | | |
| Pt + Pd(center)/Pt + Pd(outer surface) | | | | 5.1 | | | | |
| Pt + Pd(0.5R)/Pt + Pd(outer surface) | | | | 2.2 | | | | |
| Pt + Pd(center)/Pt + Pd(outer surface) | | | | | 4.1 | | | |
| Pt + Pd(0.5R)/Pt + Pd(outer surface) | | | | | 2.4 | | | |
| Pt + Pd(center)/Pt + Pd(outer surface) | | | | | | 4.6 | | |
| Pt + Pd(0.5R)/Pt + Pd(outer surface) | | | | | | 1.8 | | |
| Pt + Pd(center)/Pt + Pd(outer surface) | | | | | | | 0.91 | |
| Pt + Pd(0.5R)/Pt + Pd(outer surface) | | | | | | | 0.94 | |
| Pt + Pd(center)/Pt + Pd(outer surface) | | | | | | | | 1.10 |
| Pt + Pd(0.5R)/Pt + Pd(outer surface) | | | | | | | | 1.05 |

Note:
R is the circumradius of the cross section of the catalyst particle, with the circumcenter of the cross section of the catalyst particle as the starting point.

Figure 2:
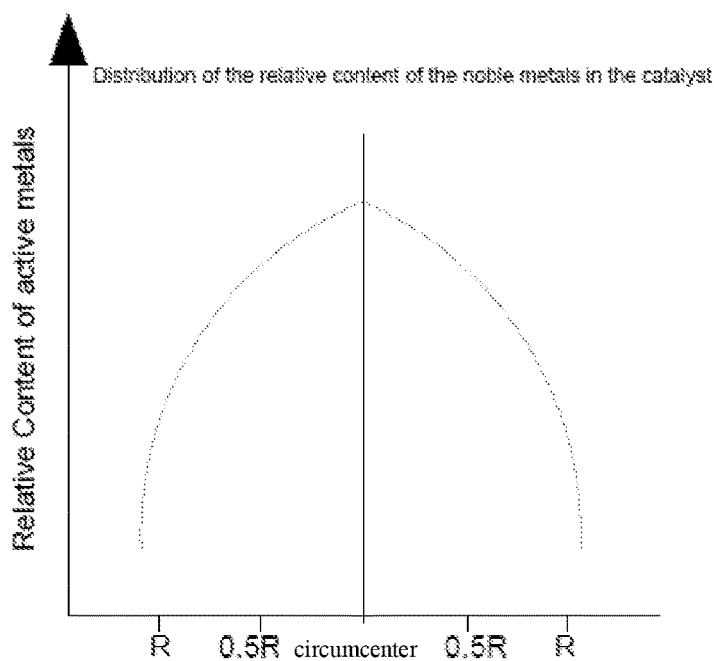
FIG. 2 is a schematic plot of the relative content distribution of the noble metal in the catalyst.
Figure 3:
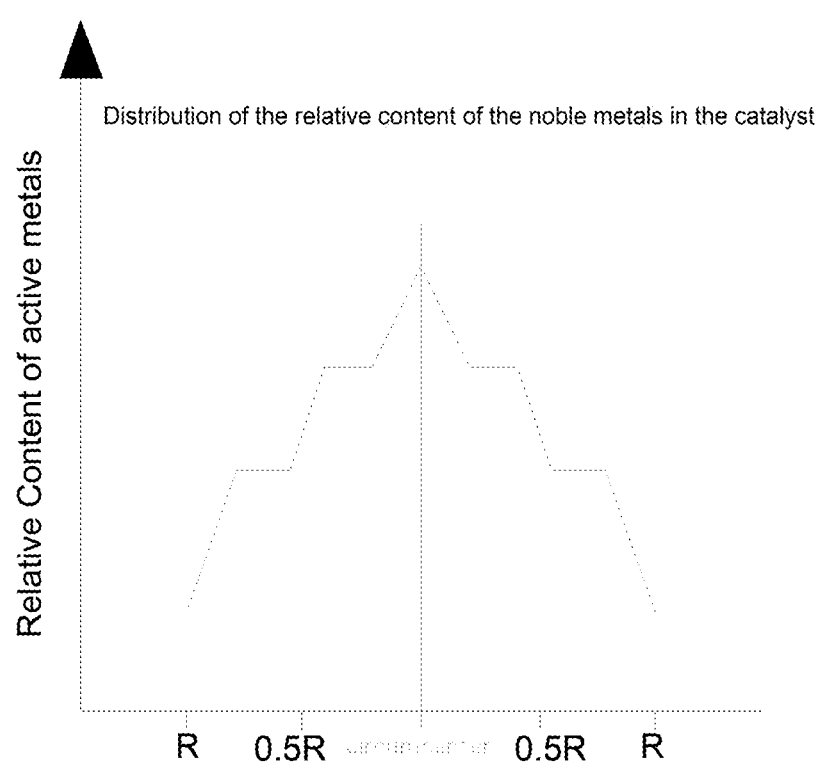
FIG. 3 is a schematic plot of the relative content distribution of the noble metal in the catalyst.

As seen in Table 1, in the catalysts A-1, A-2, A-3, A-4, A-5, and A-6 in the Examples, noble metals Pt and Pd show a trend of their contents decreasing in a gradient from inside to outside of the catalyst particle, as shown in FIG. 2 or FIG. 3; whereas, in the catalysts B-1 and B-2 in the Comparative Examples, noble metals Pt and Pd show a relative uniform distribution from inside to outside of the catalyst particle.

Example 8

Actual assessment of raw material hydrogenation was conducted using A-1, A-3, B-1, and B-2 as exemplary catalysts.

Hydrogenation assessment reaction was carried out on a 100 ml hydrogenation stationary bed, and the raw material oil for assessment was hydrogenated vacuum gas oil. The properties of raw material oil were shown in Table 2.

TABLE 2

Properties of raw material oil

| | |
|---|---|
| Density (20° C.), g/cm$^3$ | 0.8629 |
| Distillation range | |
| HK, ° C. | 357 |
| 50%, ° C. | 510 |
| KK, ° C. | 553 |
| Sulfur, μg/g | 63 |
| Aromatics content, wt % | 31.4 |

Operating conditions for the assessment were shown in Table 3.

TABLE 3

Operating conditions for the assessment

| | |
|---|---|
| Temperature, ° C. | 286 |
| Pressure, MPa | 6.0 |
| Liquid hourly mass space velocity, h$^{-1}$ | 0.75 |
| Hydrogen/oil volume ratio | 600 |

Assessment results after the catalysts operated for 200 hours were shown in Table 4, and sulfur resistance and hydrodesulfurization performance of the catalysts were shown in FIG. 1.

TABLE 4

Assessment results

| | Analysis results | | | |
|---|---|---|---|---|
| Analysis items | A-1 | A-3 | B-1 | B-2 |
| Liquid yield, wt % | 99.3 | 99.0 | 98.6 | 98.1 |
| Aromatics content, wt % | <1 | 1.3 | 3.4 | 4.7 |

As seen from the assessment results in Table 4, the catalyst for aromatics saturated hydrogenation prepared according to the present invention exhibits good refining performance, superior aromatics saturation performance, and high liquid yield, and is superior to the hydrogenation catalysts having a uniform distribution of active ingredients prepared by conventional methods. Also, as seen in FIG. 1, the catalyst for aromatics saturated hydrogenation prepared according to the present invention shows both superior hydrodesulfurization performance and excellent sulfur resistance, and is a potential catalyst for aromatics saturated hydrogenation.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method for preparing a sulfur-resistant catalyst for aromatics saturated hydrogenation, comprising the steps of:
   (1) preparing noble metal impregnation solutions from a noble metal and deionized water or an acid solution, wherein said noble metal impregnation solutions range from high to low concentration;
   (2) impregnating a carrier consisting of an inorganic porous material with the impregnation solutions by incipient impregnation; and
   (3) homogenizing for 10 min to 3 h, drying at 90 to 140° C. for 3 to 6 h, and calcinating at 350 to 650° C. for 3 to 10 h to obtain a sulfur-resistant catalyst for aromatics saturated hydrogenation;

characterized in that, during the impregnation in the above step (2), the carrier is impregnated sequentially with the impregnation solutions from high to low concentrations.

2. The method for preparing a sulfur-resistant catalyst for aromatics saturated hydrogenation according to claim 1, characterized in that the inorganic porous material is comprised of alumina and at least one selected from the group consisting of silica, titania-zirconia, alumina-silica, and alumina-zirconia.

3. The method for preparing a sulfur-resistant catalyst for aromatics saturated hydrogenation according to claim 1, characterized in that the carrier has a specific surface area of 150 to 500 m$^2$/g and a pore volume of 0.2 to 0.7 cm$^3$/g.

4. The method for preparing a sulfur-resistant catalyst for aromatics saturated hydrogenation according to claim 3, characterized in that the carrier has a specific surface area of 200 to 400 m$^2$/g and a pore volume of 0.3 to 0.6 cm$^3$/g.

5. The method for preparing a sulfur-resistant catalyst for aromatics saturated hydrogenation according to claim 2, characterized in that the mass ratio of aluminum to silicon (in terms of alumina to silica) is 1:10 to 10:1 when the inorganic porous material is comprised of alumina and at least one selected from the group consisting of silica and alumina-silica; the mass ratio of aluminum to zirconium (in terms of alumina to zirconia) is 1:20 to 20:1 when the inorganic porous material is comprised of alumina and at least one selected from the group consisting of titania-zirconia and alumina-zirconia.

6. The method for preparing a sulfur-resistant catalyst for aromatics saturated hydrogenation according to claim 1, characterized in that the noble metal is selected from at least one from the group consisting of Pt, Pd, Ru, Rh, Re, and Ir compounds, and the mass fraction of the noble metal contained in the catalyst is 0.05 to 5.0 wt %.

7. The method for preparing a sulfur-resistant catalyst for aromatics saturated hydrogenation according to claim 6, characterized in that the noble metal is one or two of the Pt, Pd, Ru, and Re compounds, and the mass fraction of the noble metal contained in the catalyst is 0.2 to 2.0 wt %.

8. The method for preparing a sulfur-resistant catalyst for aromatics saturated hydrogenation according to claim 6, characterized in that the noble metal is Pt and Pd, and the mass ratio of Pt to Pd contained in the catalyst is 1:6 to 6:1.

9. The method for preparing a sulfur-resistant catalyst for aromatics saturated hydrogenation according to claim 1, characterized in that the acid component in the acid solution is selected from at least one from the group consisting of hydrochloric acid, phosphoric acid, biphosphate, dihydric phosphate, sulfuric acid, bisulfate, acetic acid, citric acid, and nitric acid.

10. A sulfur-resistant catalyst for aromatics saturated hydrogenation prepared by the method for preparing a sulfur-resistant catalyst for aromatics saturated hydrogenation according claim 1, characterized in that the concentration of the noble metal component in the catalyst decreases from the center of the particle to the outer surface thereof, the ratio of the metal content at the circumcenter of the particle to the metal content on the circumcircle surface of the particle is 2.0 to 6.0, and the ratio of the metal content at 0.5 R to the metal content on the outer surface is 3.0 to 1.5, where the circumradius is R with the circumcenter of the cross section of the catalyst particle taken as the starting point.

11. The sulfur-resistant catalyst for aromatics saturated hydrogenation according to claim 10, characterized in that the noble metal is selected from at least one from the group consisting of Pt, Pd, Ru, Rh, Re, and Ir compounds, and the mass fraction of the noble metal contained in the catalyst is 0.05 to 5.0 wt %.

12. The sulfur-resistant catalyst for aromatics saturated hydrogenation according to claim 11, characterized in that the noble metal is one or two of the Pt, Pd, Ru, and Re compounds, and the mass fraction of the noble metal contained in the catalyst is preferably 0.2 to 2.0 wt %.

* * * * *

UNITED STATES PATENT AND TRADEMARK OFFICE
CERTIFICATE OF CORRECTION

PATENT NO. : 10,258,965 B2
APPLICATION NO. : 14/964204
DATED : April 16, 2019
INVENTOR(S) : Yang et al.

Page 1 of 1

It is certified that error appears in the above-identified patent and that said Letters Patent is hereby corrected as shown below:

In the Claims

In Claim 12, Column 10, Line 37, delete "preferably" before "0.2".

Signed and Sealed this
Eighteenth Day of June, 2019

Andrei Iancu
*Director of the United States Patent and Trademark Office*